United States Patent [19]
Yoshimura

[11] 3,931,996
[45] Jan. 13, 1976

[54] ADJUSTABLE HINGE FITTING FOR A SEAT WITH A MOVABLE BACK

[75] Inventor: Noboru Yoshimura, Toyota, Japan

[73] Assignee: Aisin Seiki Kabushiki Kaisha, Japan

[22] Filed: Nov. 19, 1973

[21] Appl. No.: 417,048

Related U.S. Application Data

[63] Continuation-in-part of Ser. No. 212,960, Dec. 28, 1971, abandoned.

[30] Foreign Application Priority Data

Dec. 28, 1970 Japan.............................. 45-127941

[52] U.S. Cl. ................. 297/366; 297/367; 297/379
[51] Int. Cl.² ........................................... A47C 1/00
[58] Field of Search ........................... 297/366–372, 297/379; 16/144, 146

[56] References Cited
UNITED STATES PATENTS

| | | | |
|---|---|---|---|
| 1,096,678 | 5/1914 | Budd | 297/367 X |
| 1,927,491 | 9/1933 | Gabb | 297/366 X |
| 2,120,156 | 6/1938 | Simpson | 297/367 |
| 2,310,476 | 2/1943 | Todd | 297/367 X |
| 2,891,602 | 6/1959 | Molins | 297/367 |
| 3,079,199 | 2/1963 | Tischler | 297/367 |
| 3,299,466 | 1/1967 | Werner | 297/366 X |
| 3,652,127 | 3/1972 | Freedman et al. | 297/372 |
| 3,663,056 | 5/1972 | Turner | 297/369 |
| 3,674,309 | 7/1972 | Fowler | 297/379 |

*Primary Examiner*—Roy D. Frazier
*Assistant Examiner*—Peter A. Aschenbrenner
*Attorney, Agent, or Firm*—Oblon, Fisher, Spivak, McClelland & Maier

[57] ABSTRACT

A two part hinge fitting especially adapted for motor vehicle seats of the type characterized by a fixed hinge member fixedly connected to the seat and a tiltable hinge member fixedly connected to the seat back being articulatedly connected to each other and including releasable locking means comprising a gear sector and a pawl, which upon being released, will permit free tilting of the tiltable hinge member and the seat back connected thereto relative to the fixed hinge member connected to the actual seat portion. The pivot means articulatedly connecting the two hinge members occupies a position away from the rear end of the seat and is biased toward the front end of the seat or toward the uppermost end of the backrest so that a larger radius of the sector gear may be designedly provided for reinforcement of the mechanism than that of previous fittings without any fear that the sector gear of such larger radius will obstruct the passenger when leaving the seat. Non-toothed ends of adjacent gear sector provide for complete tilting forwardly and backwardly of the seat back.

7 Claims, 4 Drawing Figures

ADJUSTABLE HINGE FITTING FOR A SEAT WITH A MOVABLE BACK

CROSS-REFERENCE TO RELATED APPLICATIONS

This application is a continuation-in-part of copending U.S. application Ser. No. 212,960 filed Dec. 28, 1971 and now abandoned and the parent application in entirety is incorporated by reference herein.

BACKGROUND OF THE INVENTION

1. Field of the Invention

The present invention relates generally to a hinge fitting for pivotally connecting the back of a seat at both sides thereof to the seat frame, particularly of an automobile or other vehicle, and more particularly to a releasable locking device combined with such a fitting for adjusting the degree of inclination of the back relative to the seat by means of a gear or gear sector which is associated with one part of the fitting and a pawl which is associated with the other part and adapted to engage the gear at different angular positions of the back relative to the seat.

2. Description of the Prior Art

Fittings of this type are usually provided in pairs with their two parts secured to the seat and to the back, respectively, and at each side thereof, and the two parts of each fitting are pivotably connected by a pin which otherwise serves as the swivel axis for tilting the back forwardly or rearwardly. The fittings are secured at each side of the seat in such a manner that the pins thereof are in aligned relation with each other and positioned parallel with and near the rear edge of the seat to pivot the back to the seat.

In such devices, the possibility always exists of ruining the mechanism because of shock resulting from a sudden stop of the forward travel of the vehicle, causing a passenger in the rear passenger seat of the vehicle to strike the back of the seat under considerable inertial force, unless provision is made to overcome any dangerous overloading that may be applied to the back rest by a passenger in the rear passenger seat.

In order to safeguard the mechanism against excessive stress being exerted by such overloads, and resulting breakage, the distance between the center of the pin and the teeth of the gear or gear sector may beneficially be enlarged in design. It should be noted that, for a given load, the stress exerted is inversely proportional to such distance, so that the greater the distance, the smaller will be the stress. However, larger distances necessitate enlargement of the size of the sector gear, but large size sector gears will provide an obstruction for a passenger every time he has to leave the seat. This is a shortcoming in the practice of known hinge fittings for seats with movable backs.

SUMMARY OF THE INVENTION

Accordingly, among the objects of the present invention is the provision of a device for adjusting the degree of inclination of a seat back relative to the seat portion by means of a gear sector associated with one part of the fitting and a pawl associated with the other part being adapted to engage the gear at different angular positions of the back relative to the seat, which is substantially devoid of the foregoing and related disadvantages and drawbacks inherent in the prior art arrangements.

Another object of the present invention is to provide a two-part hinge fitting for adjustably connecting a seat and a back rest of an automobile seat which does not obstruct a passenger from leaving the seat, yet is resistant to damage by the shock of a passenger in the rear seat being thrown against the back of the front seat due to the inertia of a sudden stop.

Still another object of this invention is to provide a two-part hinge fitting comprising a gear sector associated with one part and a pawl associated with the other part for adjusting the degree of inclination of a seat back relative to the seat portion which will not obstruct a passenger from leaving the seat regardless of the size of the gear sector.

Yet another object of the invention is to provide a two-part hinge fitting for adjustably connecting a seat and a back rest of an automobile seat in which the back rest is tiltable forwardly through a large angle to permit a passenger in the rear seat to leave the vehicle without difficulty and is fully foldable backward to permit the passenger therein to lie down in a rest position.

The foregoing and other objects are attained by a two part hinge fitting for adjustably connecting a seat and a back rest, especially in motor vehicles, which according to this invention comprises a first arm as one part of the hinge adapted to be fixedly connected to either the seat or back and a second arm as the other part thereof adapted to be fixedly connected to the other of the seat and back, pivot means for pivotally connecting the two arms to each other, and a device combined with such a fitting for adjusting the degree of inclination of the back relative to the seat by means of a gear sector associated with the first arm and a pawl associated with the other arm being adapted to engage the gear at different angular positions of the back relative to the seat, being characterized by the fact that the pivot means occupies a position away from the rear end edge of the seat, being biased toward the front end of the seat or uppermost end of the back so that the radius of the sector gear may be enlarged in design to be resistant against breakage by shock resulting from the sudden stop of travel of the vehicle or due to the inertia of the passenger in the rear passenger seat, and further providing for forward tilting of the back rest through a large angle to permit a rear seat passenger to disembark easily and for rearward folding to a fully reclined position to permit the front seat passenger to lie down and rest.

BRIEF DESCRIPTION OF THE DRAWINGS

Various other objects, features and attendant advantages will be more fully appreciated as the same becomes better understood from the following detailed description when considered in connection with the accompanying drawings, wherein like reference numerals designate like or corresponding parts throughout the several views, and in which.

DESCRIPTION OF THE PREFERRED EMBODIMENT

Figure 1:
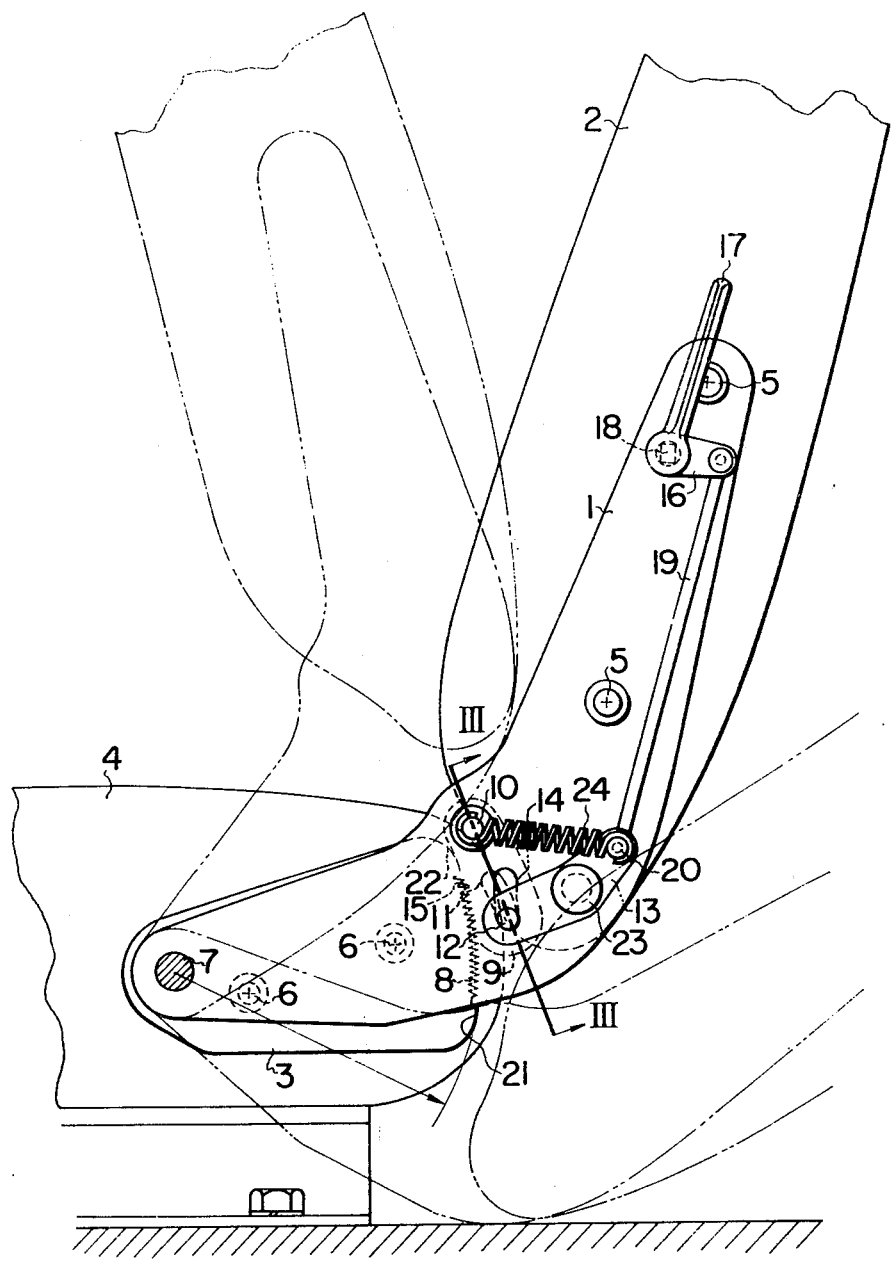
FIG. 1 shows a side view of one embodiment of the hinge fitting constructed according to the invention.

Referring now to the drawings, and more specifically to FIG. 1 thereof, it will be seen that the two part hinge fitting according to the present invention comprises a fixed first arm 3 being fixedly fastened to a seat 4 of a vehicle seat, partially shown, and a tiltable second arm 1 being fastened to a back rest 2, likewise partially shown in heavy lines while in a normal position, and in phantom by dot and dash line while in a forwardly and rearwardly tilted position, respectively. The arm 1 is intended to be secured to the back rest 2 by means of screws which are inserted into bores 5, while the arm 3 is intended to be secured to the seat 4 by means of screws which are inserted into bores 6. As shown, the arm 1 is generally acruate in shape, or L-shaped, and is pivotally connected to the arm 3 by a pin 7 on the arm providing a swivel axis for tilting the back rest, as will become more clear as the description proceeds. It will further be seen that the arm 3 is positioned inside the arm 1. A major part of the arm 3 is therefore shown in the view in phantom by dot and dash line.

Figure 3:
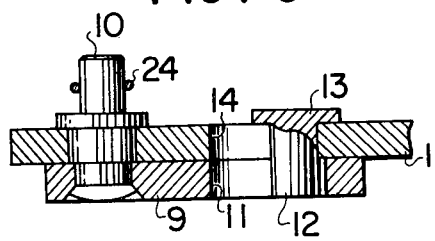
FIG. 3 is a cross section taken along the line III—III of FIG. 1.

Means are provided for retaining the back rest in a tilted position, as desired. To this end, the arm 3 is provided on its rear edge with an arcuate series of gear teeth 8 being cooperatively engaged with a series of teeth 15 of a detent pawl 9 carried by the arm 1 on its inside face by a pin 10 as shown in FIG. 3 and in phantom in FIG. 1. A pin 12 secured on the inside face of a lever 13 disposed on the outside surface of the arm 1 protrudes through the arm 1 being slidable in an arcuate slot 14 therein and extends into another cam slot 11 in the pawl 9. It should be noted that the arcuate slot 14 has the same radius as the path of the driving pin 12 while the groove or slot 11 acts as a cam groove associating with the driving pin 12. Thus, the groove 11 and the pin 12 provide a cam mechanism of the well known inverse type, in which the cam groove 11 is in the follower pawl 9 and the pin 12 which engages this groove is attached to the driving member, namely the lever 13. Rotation of the lever 13 may be replaced by an angular movement of the pawl 9 of lesser magnitude but through a sufficient angle to disengage the teeth 15 thereof from the teeth 8. The lever 13 is pivoted about a pin 23 on the arm 1 and is normally urged in a counter-clockwise direction, as seen in FIG. 1, by a spring 24 connected between a pin 20 on one end thereof and the pin 10 to engage the pin 12 with the lower end of the slot 14, as shown in FIG. 1, and the pawl 9 is in turn normally engaged with the teeth 8 of the arm 3.

A short lever 16 and a handle 17 therefor are both clamped to the arm 1 being freely oscillatable with a pin 18 thereon. The lever 16 is connected at its other end with one end of an elongate link 19 which has its other end in turn connected with the lever 13 through pin 20. When the handle 17 is manually rotated in a clockwise direction, as seen in FIG. 1, the lever 13 is similarly turned about pin 23 causing the pin 12 thereon sliding in slot 11 of the pawl 9 to move the pawl out of engagement with the teeth 8 on arm 3, so that the back rest is permitted to swing freely about the pin 7, although the pawl 9 is normally spring biased toward engagement with the teeth 8 to retain the back in any desired tilted position, when the handle 17 is returned to its neutral position.

Figure 2:
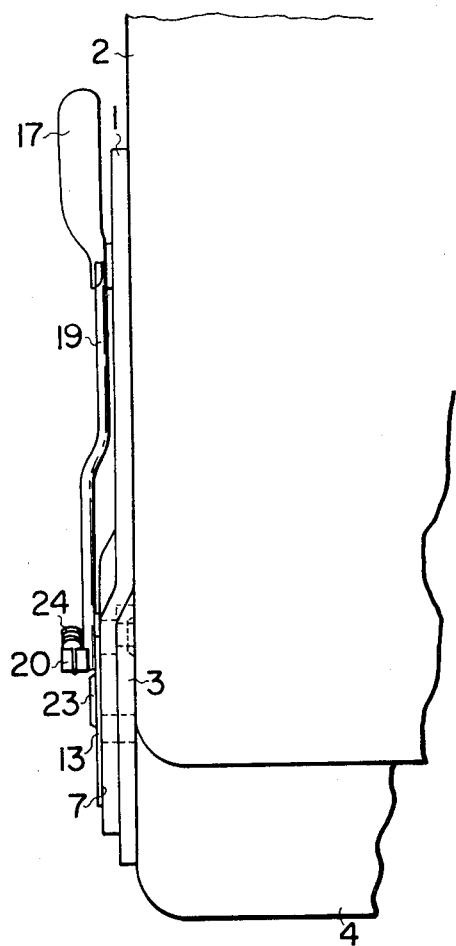
FIG. 2 shows rear view of the embodiment illustrated in FIG. 1.
Figure 4:
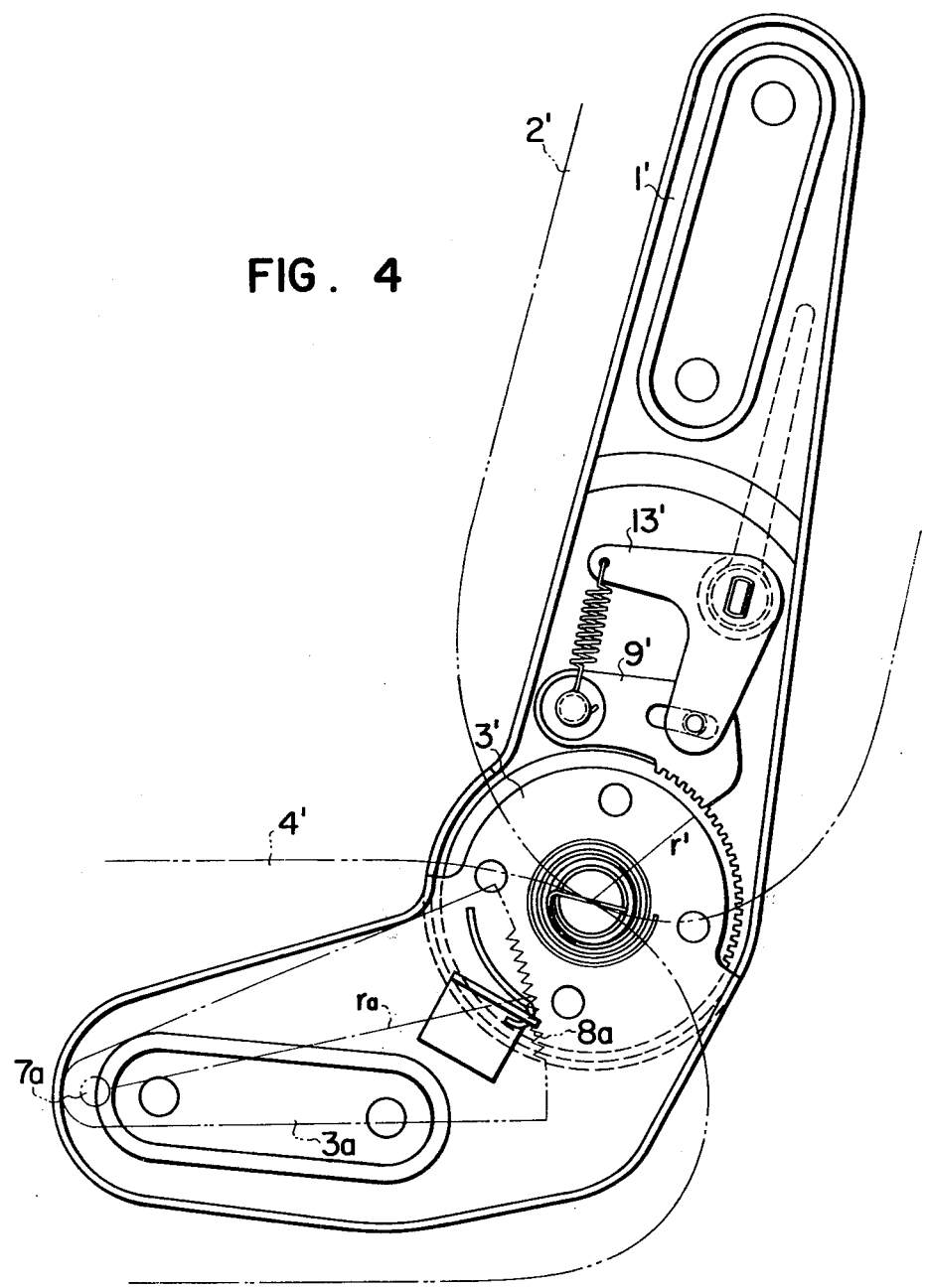
FIG. 4 is a side view of a conventional hinge fitting.

In order to compare the size of the gear of arm 3 with that of a corresponding member of conventional design which tends to be broken when a given excessive load is applied thereto, an outline of the arm 3 is indicated by dot and dash lines at 3a in FIG. 4, wherein a fitting of conventional design is shown. In FIG. 4, reference numerals with prime refer to similar parts shown in FIGS. 1 to 3 of the embodiment of the fitting according to the present invention. Reference characters 7a and 8a accordingly respectively correspond to numerals 7 and 8 in FIG. 1. It is apparent from the illustration that the radius ra of the arm 3a is far larger than that of r' of the gear 3', but will present less obstruction for the passenger having to leave the seat than would be presented by the conventional gear 3'.

It is evident, therefore, that the aforementioned advantages are achieved in the embodiment shown in FIG. 1 by positioning the pin 7 of the fitting away from the rear end of the seat 4 and biasing the same toward the front end of the seat through the cooperation of the spring 24, the lever 13, the pawl 9 and gear sector 8 on the arm 3.

Further, as shown in FIG. 1, the arm 3 is provided at its teeth end portion with non-toothed end portions 21 and 22. The curvature of the non-toothed portions is concentric to the center of rotation of the arm 1 and the radius of the curvature is slightly larger than that of the toothed portion 8, that is, it is longer than the distance from the pin 7 to the apex of any one of the teeth of the series of teeth 8. Thus, when the pawl 9 is disengaged from the arm 3 and the back 2 is forwardly tilted until at least the outermost tooth of the pawl 9 reaches the non-toothed portion 22, it thereafter is not necessary to continue the releasing operation of the handle 17 to further tilt the back 2, because the pawl 9 then is lifted out of engagement with the gear teeth 8 and simply slides over the non-toothed portion, so that the back 2 may be tilted forwardly through a very large angle regardless of the pawl and gear arrangement. With this particular arrangement, as illustrated, the back may be subtantially folded down upon the front seat.

Additionally, in the same fashion, when the pawl 9 is disengaged from the arm 3 and the back 2 is tilted backwards until at least the outermost tooth of the pawl 9 reaches the non-toothed portion 21, it is no longer necessary to continue releasing of the pawl-arm engagement with the handle 17, since the pawl 9 then simply slides over the non-toothed portion 21, so that the back 2 may be tilted to a substantially completely reclined position wherein it rests upon the rear seat of the vehicle, such that the occupant may lie down in a position of repose for resting after a long period of travel.

It should be understood that the same results will be obtained by positioning the pin 7 of the fitting away from the rear end of the seat and by biasing the same toward the uppermost end of the back, or effectively reversing the positions or functions of the gear sector and pawl.

Various other modifications and variations of the present invention are possible in light of the above teachings. It is to be understood therefore, that within the scope of the appended claims, the invention may be practiced otherwise than as specifically described herein.

What is claimed as new and desired to be secured by Letters Patent of the United States is:

1. A two-part hinge fitting for adjustably connecting a seat and a back rest, especially for motor vehicles, comprising, in combination:
a first arm provided with an arcuate series of teeth at one edge and being secured to either one of the seat and back rest;
a second arm pivoted at one end to said first arm and being secured to the other one of the seat and back rest;
a pawl pivoted to said second arm and having a cam groove therein and being provided with a series of teeth for engaging the arcuate series of teeth on said first arm;
a control means operatively connected to the pawl through a pin freely slidable in said cam groove thereof for governing engagement thereof with the arcuate series of teeth on said first arm;
manually operative handle means pivoted on said second arm and being operatively connected to said control means; and
spring means anchored at one end thereof to a pin which pivotally connects said pawl to said second arm and at the other end to said control means;
said first arm being formed with non-toothed portions at both ends of the arcuate series of teeth thereon and being of a radius of curvature concentric to the center of rotation of said second arm, said radius of curvature being slightly greater than the distance from the center of rotation of said second arm to the apex of any one tooth of the series of teeth on said first arm, whereby the pawl may be smoothly and safely disengaged from the series of teeth on said first arm with at least the outermost one of the teeth of said pawl riding over one of said non-toothed portions, and hence, the back rest may be tilted through a large angle forwardly and backwardly beyond the normal range of adjustment to a folded down position and a fully reclined position, respectively; and
characterized by the fact that said second arm is so pivoted to the first arm that the pivoting pin thereof is positioned away from the rear edge of said seat.

2. A two part hinge fitting as defined in claim 1, wherein said second arm is generally L-shaped in configuration.

3. A two part hinge fitting as defined in claim 1, wherein said control means is connected through a link with said manually operative handle means.

4. A two part hinge fitting as defined in claim 3, wherein said control means is a lever provided at one end with said pin freely slideable in said cam groove in the pawl and at its other end with another pin connecting the same with said link.

5. A two part hinge fitting as defined in claim 3, wherein the manually operative handle means consists of a handle and a lever connected integrally therewith at one end and at another end being rotatably connected to said link.

6. A two part hinge fitting as defined in claim 1, wherein the second arm has a slot provided therein through which said pin on said control means is permitted to protrude to engage said cam groove in said pawl.

7. A two part hinge fitting for adjustably connecting a seat and a back rest, especially for motor vehicles, comprising, in combination:
a first arm provided with an arcuate series of teeth at one edge and being secured to either one of the seat and back rest;
a second arm pivoted at one end to said first arm and being secured to the other one of the seat and back rest;
a pawl having a cam groove therein and being pivoted to said second arm and provided with a series of teeth for engaging the arcuate series of teeth on said first arm;
a control means in the form of a lever operatively connected to the pawl through a pin at one end thereof which is freely slidable in said cam groove for governing engagement thereof with the arcuate series of teeth on said first arm;
manually operative handle means pivoted on said second arm and being operatively connected to said control means through a link; and
spring means anchored at one end thereof to a pin which pivotally connects said pawl to said second arm and at the other end to said control means;
characterized by the fact that said second arm is so pivoted to the first arm that the pivoting pin thereof is positioned away from the rear edge of said seat.

* * * * *